United States Patent [19]

Erhardt

[11] Patent Number: 5,301,399
[45] Date of Patent: Apr. 12, 1994

[54] PROCESS OF DETECTING AND COMPENSATING POSITION ERRORS OCCURRING DURING THE MANUFACTURE OF A WEB CONSISTING OF A MULTILAYER NON-WOVEN FABRIC

[76] Inventor: Dietmar Erhardt, Sulzer Str. 116, D-7277 Wildberg, Fed. Rep. of Germany

[21] Appl. No.: 679,082
[22] PCT Filed: Dec. 18, 1989
[86] PCT No.: PCT/EP89/01555
§ 371 Date: Jun. 20, 1991
§ 102(e) Date: Jun. 20, 1991
[87] PCT Pub. No.: WO90/07148
PCT Pub. Date: Jun. 28, 1990
[51] Int. Cl.$^5$ .............................. D04H 3/05
[52] U.S. Cl. ........................ 28/102; 19/300; 19/163
[58] Field of Search .............. 28/100, 102, 101, 142, 28/157; 112/314, 315, 121.11, 304; 250/359.1, 559; 364/469, 470, 471; 271/84, 199, 202, 267, 227; 19/300, 163, 296, 302

[56] References Cited

U.S. PATENT DOCUMENTS

| 3,557,351 | 1/1971 | Doering | 250/83.3 |
| 4,052,239 | 10/1977 | Chen | 28/100 |
| 4,183,985 | 1/1980 | Lemieux | 28/162 |
| 4,491,831 | 1/1985 | Sakai et al. | 66/163 |
| 4,586,372 | 5/1986 | Massen | 26/51.5 |
| 4,766,649 | 8/1988 | Rudt et al. | 19/98 |
| 4,867,087 | 9/1989 | Suzuki et al. | 112/314 |
| 5,107,780 | 4/1992 | Braun | 112/314 |

FOREIGN PATENT DOCUMENTS

| 231618 | 9/1986 | European Pat. Off. . |
| 3001980 | 7/1981 | Fed. Rep. of Germany . |
| 3519391 | 12/1985 | Fed. Rep. of Germany | 112/315 |
| 3501897 | 7/1986 | Fed. Rep. of Germany . |
| 3540126 | 2/1987 | Fed. Rep. of Germany | 112/121.11 |
| 3230191 | 9/1988 | Japan | 112/315 |

Primary Examiner—Clifford D. Crowder
Assistant Examiner—Amy B. Vanatta
Attorney, Agent, or Firm—Dvorak and Traub

[57] ABSTRACT

It is desired to detect and to compensate position errors occurring during the manufacture of a web consisting of a multilayer non-woven fabric by means of a laying machine, in which a web consisting of a monolayer non-woven fabric is supplied to a conveyor belt transversely to the direction of travel of said belt and is laid onto said belt by a reciprocating motion to form a multilayer web. For that purpose, the measured value signal is analyzed by machine, preferably by a Fourier transformations for errors consisting of periodically occurring fluctuations of the signal amplitude and the velocity of the conveyor belt and/or the velocity at which the monolayer non-woven web is supplied and/or the width in which the monolayer non-woven web is supplied and/or the width in which the non-woven web is laid onto the delivering belt are automatically controlled to minimize the periodic fluctuations of the signal amplitude.

14 Claims, 5 Drawing Sheets

PROCESS OF DETECTING AND COMPENSATING POSITION ERRORS OCCURRING DURING THE MANUFACTURE OF A WEB CONSISTING OF A MULTILAYER NON-WOVEN FABRIC

TECHNICAL FIELD

This invention relates to a process of detecting and compensating position errors occurring during the manufacture of a web consisting of a multilayer non-woven fabric by means of a laying machine, in which a web consisting of a monolayer non-woven fabric is supplied to a conveyor belt (hereinafter called delivering belt) transversely to the direction of travel of said belt and is laid onto said belt by a reciprocating motion to form a multilayer web and the thickness of the multilayer non-woven fabric and/or its mass per unit of area is continually measured.

The process is carried out in a laying machine, which comprises a conveyor belt, which serves to supply a web consisting of a monolayer non-woven fabric and which is deflected at its leading end around a roller, which will be described hereinafter as a laying roller, a motor for driving the conveyor belt, a traversing drive for reciprocatively displacing the laying roller in and opposite to the direction of conveyance of the conveyor belt a delivering belt, which is disposed below the laying roller and extends transversely to the conveyor belt a motor for driving the delivering belt, and a measuring device for measuring the thickness and/or the mass per unit of area of the multilayer non-woven web.

In such a laying machine a web consisting of a monolayer non-woven fabric is supplied by a conveyor belt to a delivering belt which is disposed under the conveyor belt and extends transversely thereto. The for nd of the conveyor belt performs a traversing motion, that is, a reciprocating motions and after each reversal of the motion of the laying roller the monolayer non-woven fabric is laid onto the delivering belt in such a manner that the web partly overlaps that layer of the non-woven fabric which has been laid before the reversal of the motion of the laying roller. The degree of overlap will depend on the velocity at which the web consisting of the monolayer non-woven fabric is supplied and laid, on the velocity of the travel of the delivering belt, on the width of the non-woven fabric which is supplied and on the width of the non-woven fabric which has been laid in a plurality of layers. The latter width will be determined by the distance which is traveled by the laying roller during its reciprocating motion. Because the delivering belt is moved transversely to the conveyor belt and transversely to the laying roller, the web is laid onto the delivering belt in a plurality of layers, which obliquely overlap each other. The number of the layers and the width of the resulting multilayer non-woven web may be changed as desired by a variation of the width of the non-woven web which is supplied, the velocity at which the web is laid, the velocity at which the delivery is effected and the deflection of the laying roller. Incorrect settings may have the result that the layers do not adjoin without a gap or are not laid with a controlled, predetermined spacing. An "underlap" may occurs when the delivering belt is moved at an excessive relative velocity and gaps occur between the several layers. On the other hands an insufficient relative velocity of the delivering belt will result in an "overlap" because adjacent layers are laid one over the other.

If a multilayer web is desired which has a uniform thickness and a uniform density, an overlap or underlap will not be permissible but the laying machine must be operated with such a setting that the layers of the non-woven fabric formed by the monolayer non-woven fabric will exactly abut. Such webs consisting of a multilayer non-woven fabric on a woven textile backing are needed in paper machines as a covering on rolls in the press section and in the drying section of the paper machine. It will not be possible to make a uniform paper web unless the rolls are covered with a non-woven fabric or felt which has a uniform thickness and a uniform density. Very high losses may result from the operation of a paper machine in which a non-woven fabric or felt is used which is not uniform in thickness and density. For this reason, papermakers impose stringent requirements regarding the qualities of the non-woven fabrics or felts and, as a rule, agree with the suppliers of the non-woven fabrics or felts that high penalties will be payable in case of a supply of defective non-woven fabrics or felts.

For this reason the maker of the non-woven fabrics faces the problem how the thickness and density of the non-woven fabrics can be monitored.

PRIOR ART

From DE-30 01 980 C2 it is known that the thickness and the weight per unit of area of endless paper machine felts can automatically be measured and checked and the measured values can be displayed, as amended under Chapter II, on a screen or can be printed out or can graphically be represented by a plotter. The operators of the laying machine will then try to estimate from such data the presumably optimum setting of the laying machine and to make the required readjustments at the laying machine. That procedure is repeated so that the optimum setting of the machine is gradually approached by a repeated readjustment and subsequent check. That practice requires a lot of experience and takes much time whereas it does not ensure the desired result residing in the production of a faultless multilayer non-woven fabric.

It is known from U.S. application Ser. No. 3,557,351 to measure the thickness of a web during the manufacture of paper or plastic foils and to control the thickness by use of the measured-value signal to show a constant value. To effect this at first the periodical fluctuations of the measured-value signal are suppressed so that they do not influence the control action. Thereafter the control is carried out using a signal which is free of said periodical fluctuations.

SUMMARY OF THE INVENTION

It is an object of the invention to provide a process of detecting and compensating position errors occurring during the manufacture of a web consisting of a multilayer non-woven fabric which can be automated and results more reliably in the manufacture of a faultless non-woven fabric whereas a lower expenditure is involved.

That object is accomplished by a process of detecting and compensating position errors occurring during the manufacture of a web consisting of a multi-layer non-woven fabric by means of the laying machine, in which a web consisting of a monolayer non-woven fabric is supplied to a conveyor belt (hereinafter called delivering belt) transversely to the direction of travel of said belt and is laid onto said belt by a reciprocating motion to form a multi-layer web, and the thickness of the multi-layer non-woven fabric and/or its mass per unit of area is continually measured and a measured-value signal representing the thickness of the mass per unit of area is formed and analyzed by machine for errors consisting of periodically occurring fluctuations of the signal amplitude, and the velocity of the conveyor belt and/or the velocity at which the monolayer non-woven web is supplied and/or the width in which the monolayer non-woven web is laid onto the delivering belt are controlled to minimize the periodic fluctuations of the signal amplitude. A laying machine which is particularly suitable for carrying out the process in accordance with the invention comprises a conveyor belt, which serves to supply a web consisting of a monolayer non-woven fabric and which is deflected at its leading end around a roller, which will be described hereinafter as a laying roller, a motor for driving the conveyor belt, a transversing drive for reciprocatively displacing the laying roller in and opposite to the direction of conveyance of the conveyor belt, a delivering belt, which is disposed below the laying roller and extends transversely to the conveyor belt, a motor for driving the delivering belt, a measuring device for measuring the thickness and/or the mass per unit of area of the multi-layer non-woven web, an analyzer to which the output signal of the measuring device is supplied and which analyzes the output signal for periodically occurring signal portions contained therein, and a controller, which is connected to final control elements consisting of the motor for driving the conveyor belt and/or to the traversing drive for the laying roller and/or to the motor for driving the delivering belt and which is fed from the analyzer with a controllable variable consisting of the amplitude of the periodically occurring signal portions, which amplitude is to be minimized. Desirable further features of the invention are subject matters of the dependent claims.

The invention utilizes the fact that position errors will occur with a certain periodicity. If the thickness and/or the mass per unit of area of the multilayer non-woven fabric is continually monitored by a measuring device, the ideal measured-value signal for a non-woven fabric which is homogeneous and is uniform in thickness and density will be a signal having a constant amplitude. An overlap or underlap will result in a corresponding periodic change of the measured-value signal. But because a non-woven fabric is not homogeneous in fact, the measured-value signal is rather noisy; particularly as a result of fluctuations of the thickness and of the mass per unit of area, which fluctuations are already exhibited by the starting material which is constituted by the web consisting of a monolayer non-woven fabric. For this reason the operators of a laying machine would not be able to use such a continually obtained measured-value signal for direct conclusions as regards the quality of the multilayer non-woven fabric. But in accordance with the invention the periodic disturbances contained in the measured-value signal can be determined and utilized in that the measured-value signal is analyzed by a machine, particularly in a computer-assisted analysis. The periodic disturbances which have been determined will then be minimized by an automatic control in that they are used as a controlled variable in a feedback control system, in which the manipulated variable consists of the velocity of the conveyor belt and/or the velocity at which the monolayer non-woven web is supplied and/or the width of the monolayer non-woven web which is supplied and/or the width in which the monolayer non-woven web is laid onto the conveyor belt. That practice will permit an automatic control of the thickness and of the mass per unit of area of the multilayer non-woven fabric in a manner which does not depend on the experience and skill of the operators of the laying machine.

It will be particularly simple to recognize the periodic disturbances in the measured-value signal if the measured-value signal is analyzed in terms of frequency, particularly by a Fourier transformations go that instead of a signal which is continuous with time a spectrum is obtained, which will consist of a line spectrum in case of a Fourier transformation to be performed by a computer. In that line spectrum the signal portions which are due to position errors can be detected because at the frequencies which are related to the periodicity of the position errors the spectrum contains spectral lines having an amplitude which conspicuously projects from the noise portion of the spectrum. In the process in accordance with the invention the parameters to which the laying machine has been set are automatically controlled to minimize said frequencies which are conspicuously strongly exhibited by the spectrum.

The detection of the position errors in the spectrum may be facilitated in that high frequencies are filtered from the measured-value signal by a low-pass filter before the Fourier transformation. As a result, the noise portion of the measured-value signal can substantially be suppressed because higher frequencies predominate in the noise portion and low frequencies predominate in those portions of the measured-value signal which are due to wrong settings of the laying machine. Alternatively, the high frequency may not be taken into account in the computation.

A filtering by a low-pass filter may also be used to advantage if the measured-value signal is not subjected to a Fourier transformation. Even in an untransformed measured-value signal the periodic disturbances which are due to position errors will distinctly be apparent after a filtering by a low-pass filter so that they can be minimized by automatic control.

On principle, it will be sufficient to detect the thickness and/or the mass per unit of area of the multilayer non-woven fabric by a measuring device by which the web which has been withdrawn is continually monitored. But the reliability of the monitoring and of the automatic control of the laying machine can be improved by the use of a plurality of measuring devices, which measure the thickness of the non-woven fabric and which are so arranged that they monitor the non-woven fabric at a plurality of locations which are juxtaposed with respect to the direction of travel of the non-woven fabric. It is then endeavored by the automatic control to minimize in each of the measured-value signals the amplitudes at the conspicuous frequencies which are due to position errors.

BRIEF DESCRIPTION OF THE DRAWINGS

Two preferred illustrative embodiments of the invention will be explained hereinafter with reference to the accompanying diagrammatic drawings.

FIG. 4 is an elevation showing the delivering belt and over the delivering belt a measuring device for measuring the thickness and/or the mass per unit of area of the multilayer non-woven fabric on the delivering belt.

DESCRIPTION OF THE EMBODIMENTS OF THE INVENTION

Figure 1:
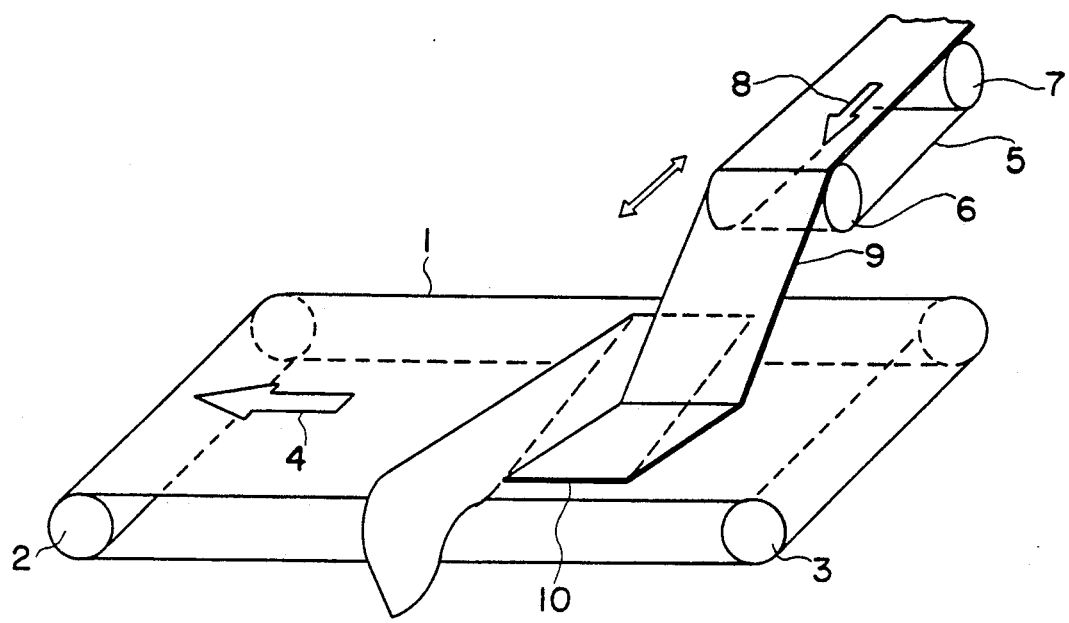
FIG. 1 is a perspective view showing how the delivering belt of a laying machine and the conveyor belt which extends transversely to the delivering belt and serves to supply a non-woven fabric are associated with each other.
Figure 2:
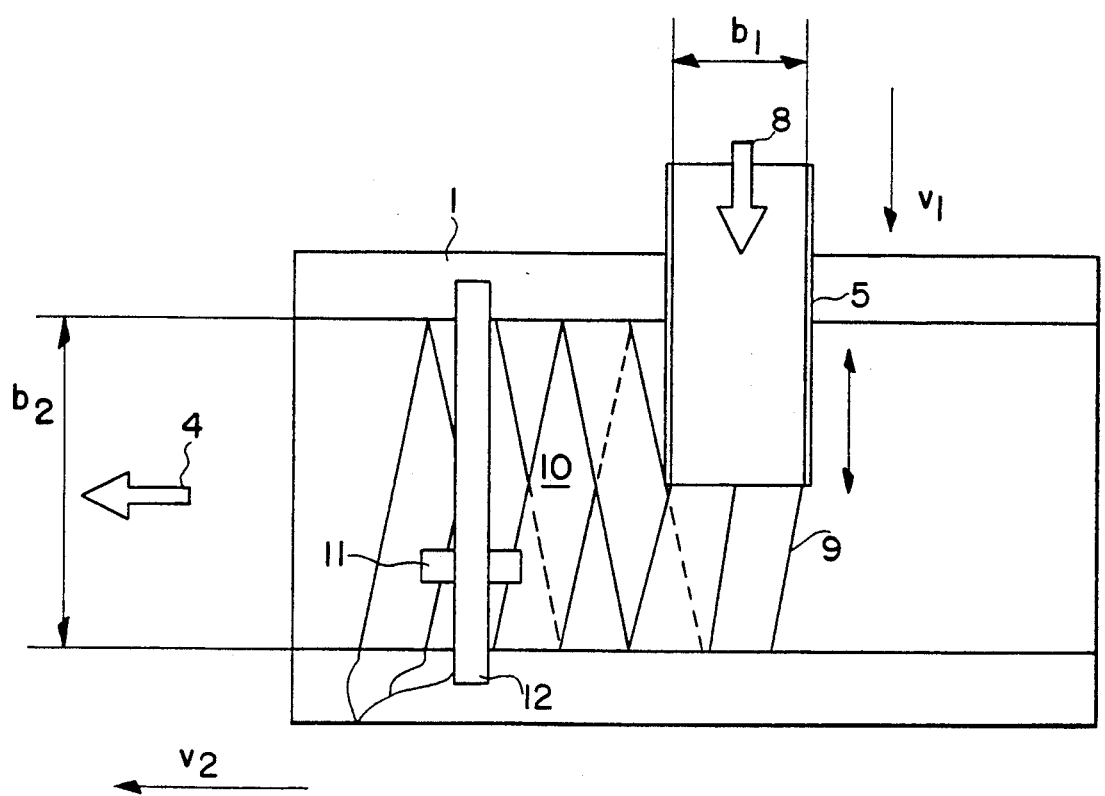
FIG. 2 is a top plan view showing the arrangement of FIG. 1.

FIGS. 1 and 2 show a horizontal delivering belt 1 consisting of an endless conveyor belt which is trained around two rollers 2 and 3, one of which is driven. The upper course of the delivering belt 1 moves in the direction indicated by the arrow 4. An endless conveyor belt 5 is disposed above the delivering belt 1 and is trained around two horizontal rollers 6 and 7. The direction of travel of the upper course of that conveyor belt 5 is indicated by the arrow 8. The direction of travel of the conveyor belt is transverse and in the illustrated embodiment is at right angles to the direction of travel of the delivering belt 1. The forward roller 6 which is associated with the conveyor belt 5 is driven and is described as a laying roller; it is disposed above the delivering belt 1 and is displaceable by a reciprocation in a direction which is parallel to the direction of travel 8 of the conveyor belt 5. That displacement may be effected, for example, by means of a fluid-operable cylinder, by a screw drive or by a rack-and-pinion mechanism. The laying roller 6 can be reciprocated forwardly and backwardly by a distance which can be selected and will be described as a stroke hereinafter.

The conveyor belt 5 serves to supply a web 90 which consists of a monolayer non-woven fabrics which is laid onto the delivering belt 1. During the laying operation the laying roller 6 is moved forwardly and rearwardly that the web 9 is laid onto the delivering belt in the form of overlapping oblique layers. The degree of the overlap will depend on the width b1 of the web go on the velocity v1 at which the web 9 is supplied, on the stroke of the laying roller 6 and on the velocity v2 at which the delivering belt 1 revolves. The stroke of the laying roller 6 will determine the width b2 of the multi-layer web 10, which consists of the non-woven fabric which is delivered.

For a non-woven fabric consisting of four double layers (eight individual layers), an optimum laying can be achieved with the following numerical values:

v1 = 40 m/min
b1 = 2 m
b2 = 7.5 m
v2 = 1.33 m/min

For a monitoring of the thickness and/or the mass per unit of area of the web 10, a measuring device is provided above the delivering belt 1 and is displaceable along a rail 12 in a direction which is transverse to the direction of travel 4 of the delivering belt. A density, measurement may be adopted if the laid material has a low density. But if the laid material has a high density, a thickness measurement may be adopted. For a density measurements radiation may be directed through the material and the degree of absorption may be detected.

Figure 3:
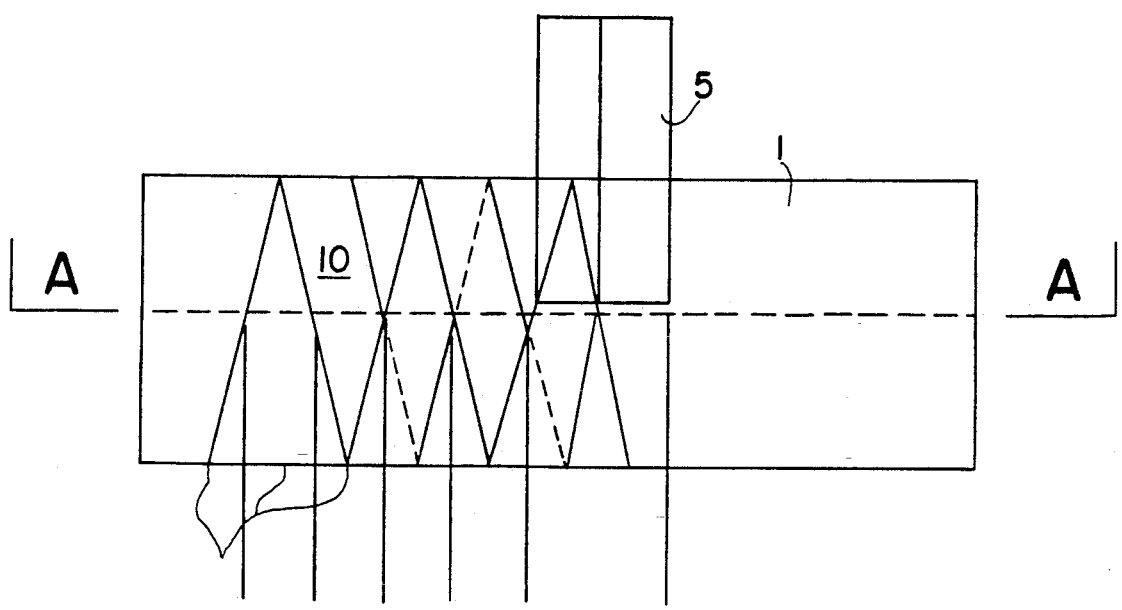
FIG. 3 is a view that is similar to FIG. 2 and illustrates the occurrence of position errors.
Figure 3A:
Figure 3B:
Figure 3C:
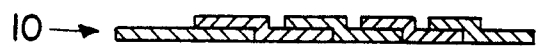

When an optimum matching and adjustment of the velocities v1 and v2, the width b1 of the web 9 which is supplied, and the stroke of the laying roller 6 have been achieved, the overlapping strips on the delivering belt 1 will exactly abut and a multilayer web 10 of uniform thickness will be obtained. This is illustrated in FIG. 3 by way of example for a two-layer web 10, the layers of which are shown in a section taken on a line A—A. In case of an optimum setting the result shown in FIG. 3a will be obtained, a wrong setting may result in an overlap (FIG. 3b) or an underlap (FIG. 3c). An overlap may be eliminated by an increase of the velocity v2 of the delivering belt. An underlap may be opposed by a decrease of the velocity v2 of the delivering belt. Alternatively, the velocity at which the monolayer web 9 is supplied may be reduced to eliminate an overlap or increased to eliminate an underlap. The measuring device 11 may be displaced to detect whether the multilayer web 10 has the desired width. Otherwise the stroke of the laying roller 6 may be changed accordingly.

In the simplest case the measuring device 11 may be stationary. In that case only the layer 10 is moved along under the measuring device and a plurality of cycles may be evaluated. If, on the other hand, the measuring device is moved transversely to the direction of travel 4 of the delivering belt 1, the number of cycles which can be measured and evaluated cannot exceed the number of layers of the web 10. Besides, a plurality of juxtaposed measuring devices 11 may be provided on the rail 12 and may be used to scan the multilayer web 10 at a plurality of locations at the same time.

Figure 4A:
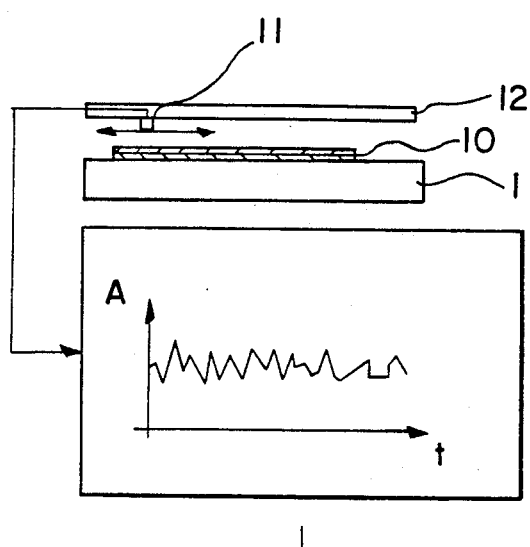
FIG. 4a shows a noisy measured-value signal generated by such measuring device.

The measuring device 11 delivers an analog or digital output signal, which may not only contain position errors but will also reflect fluctuations in density and/or fluctuations in thickness which had already been exhibited by the starting material in the web 9. For this reason the output signal is rather noisy. An example of such output signal is shown in FIG. 4a, in which the amplitude A of the output signal is plotted against time t. For an evaluation of that signal it is edited by machine and can be filtered by a low-pass filter for suppressing higher-frequency signal portions which are not due to position errors so that the low-frequency signal portions which are due to position errors become more distinctly prominent. An idealized representation of such a filtered signal is apparent from FIG. 4b. In practice the filtered signal will not be so smooth. It is seen that the amplitude of the filtered signal distinctly decreases in periodic intervals. That decrease is due to a position error. A particularly desirable other method resides in that the output signal is subjected to a Fourier transformation so that a spectrum is obtained which may have the appearance shown, for example, in FIG. 4c, in which the spectral power density SLD is plotted against frequency.

Figure 4B:
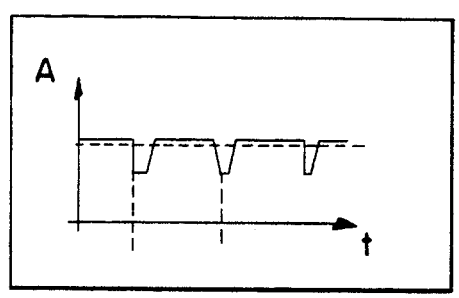
FIG. 4b is an idealized representation of the measured-value signal after a filtering by a low-pass filter.
Figure 4C:
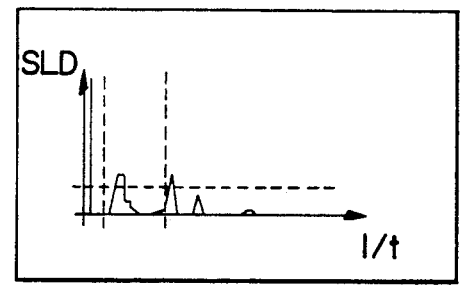
FIG. 4c shows the measured-value signal of FIG. 4 after a Fourier transformation.
Figure 5:
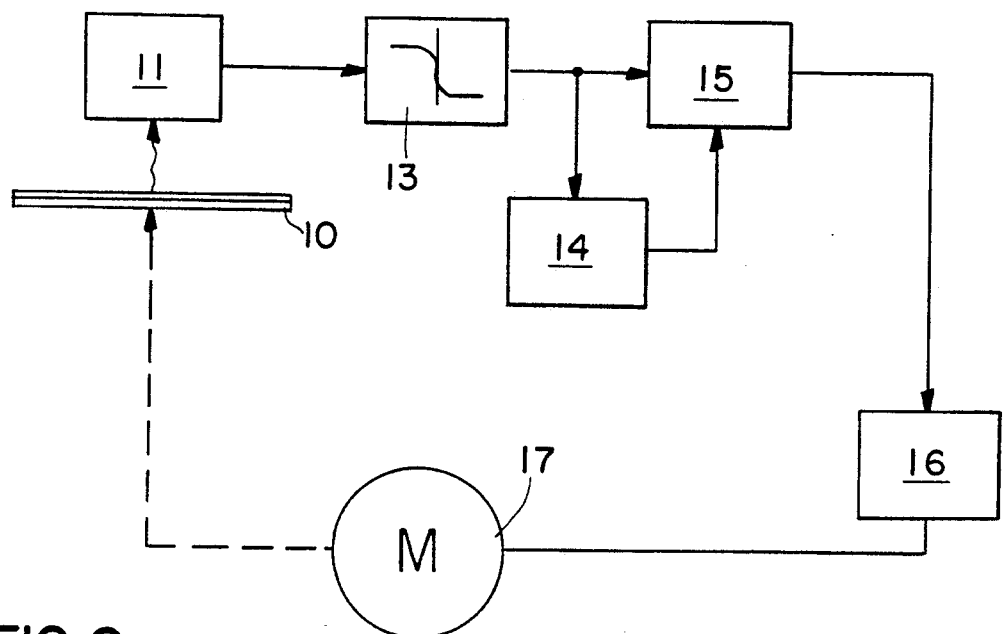
FIG. 5 is a block diagram showing a feedback control system for an illustrative embodiment of the process in accordance with the invention in which the analog output signal of a thickness-measuring device is subjected to an analog evaluation after a filtering by a low-pass filter.

The filtered output signal shown in FIG. 4b may be evaluated in a feedback control system such as is shown in FIG. 5. The feedback control system comprises the following elements: A measuring device 11, which measures the thickness or the mass per unit of area of the multilayer web 10 and delivers a corresponding analog output signal to a low-pass filter 13, which could alternatively consist of a digital filter. In the above mentioned numerical example of a non-woven fabric consisting of four double layers there can be used a low-pass filter having a cut-off frequency of 1 Hz because the output signal obtained by monitoring the non-woven fabric will exhibit a fundamental frequency of about 0.09 Hz. The output signal which is delivered by the low-pass filter and from which the high-frequency portion has been removed is fed to a comparator on a direct channel and on a channel that comprises an integrator 14, which generates a mean value of the signal amplitude. The comparator compares the actual amplitude of the signal with the mean value of the amplitude and delivers the difference thereof as a controlled variable to a controller 16. When that difference decreases below a certain threshold value the controller 16 delivers as a manipulated variable a signal to the motor 17 which drives the forward roller 2 of the delivering belt 1. By the controller 16 the manipulated variable is so selected that the difference between the actual amplitude and its mean value is minimized. As a result, a decrease of the amplitude to a value which is not below the dotted line in FIG. 4b will no longer be corrected by the controller 16.

Figure 6:
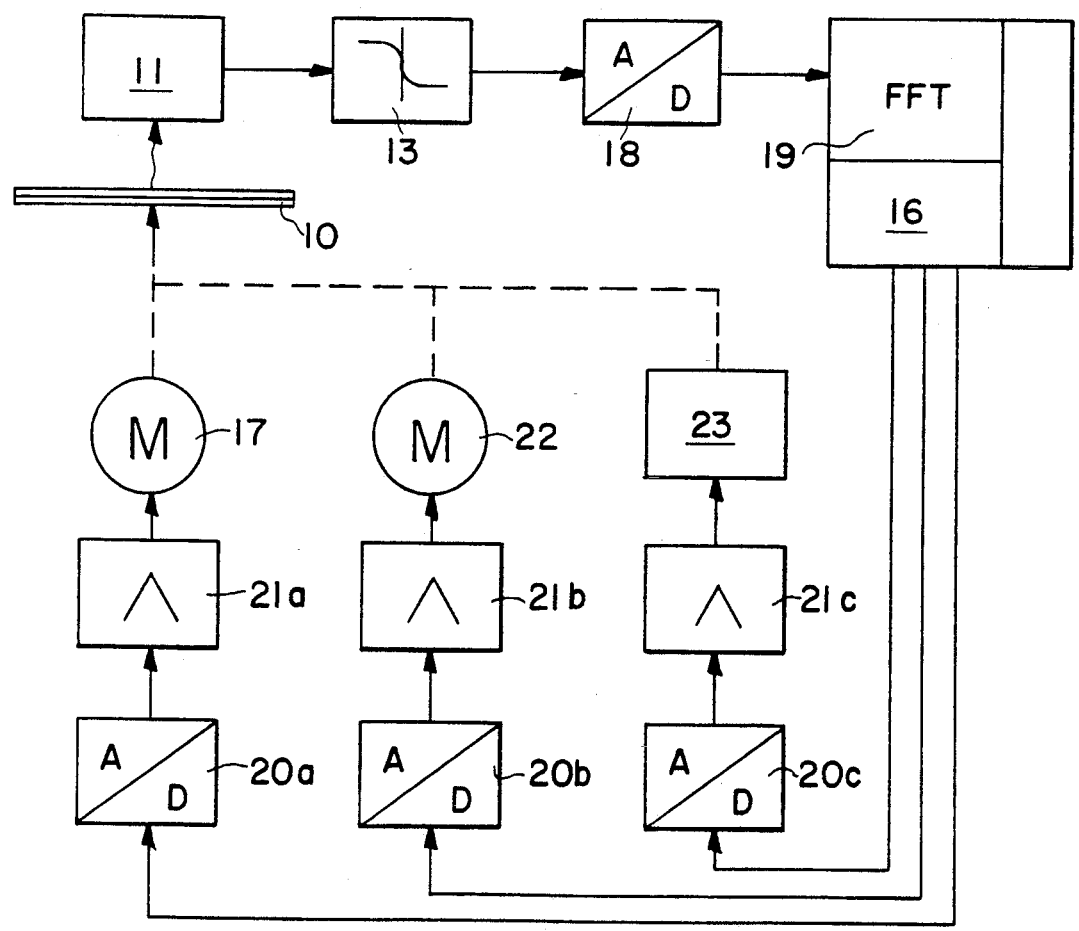
FIG. 6 is a block diagram showing a feedback control system which is used in an embodiment of the process in accordance with the invention in which the analog output signal of a thickness-measuring device is digitalized and subjected to a Fourier transformation.
Figure 7:
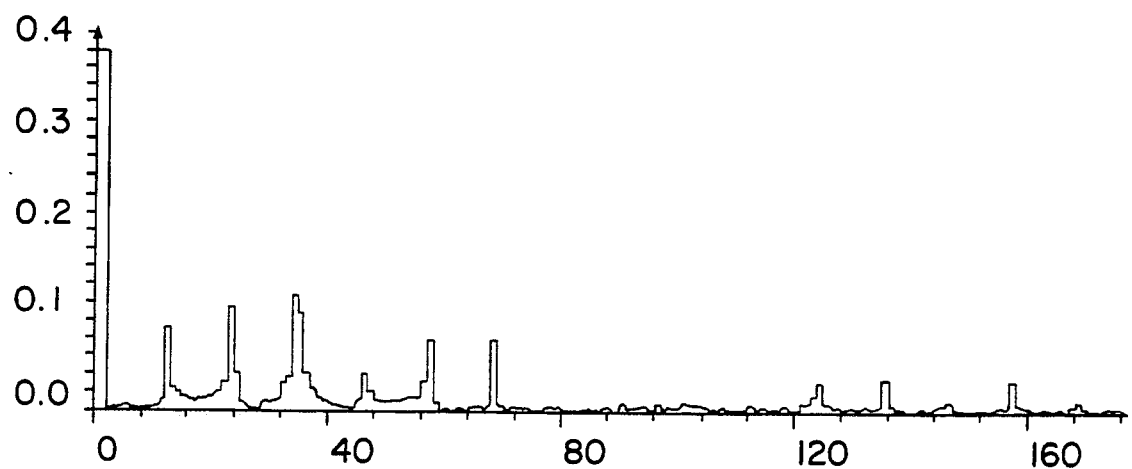
FIG. 7 shows an example of a spectrum which has been obtained by such Fourier transformation before setting errors of the laying machine have been corrected by automatic control.

FIG. 6 shows an example of a feedback control system which may be used in the special case in which the output signal of the measuring device 11 is subjected to a Fourier transformation. That feedback control system has the following elements: The analog output signal of the measuring device 11 is first delivered to a low-pass filter 13, in which the high-frequency portions are removed from the signal. That low-pass filter is desirable but is not essential. The output signal of the low-pass filter 13 is delivered to an analog-to-digital converter 18, by which the signal is digitalized and delivered to a microcomputer 19. In the microcomputer 19 the signal is subjected to a fast Fourier transformation (FFT) so that a line spectrum is obtained such as is represented in FIG. 7 by a graph, in which the spectral, power density is plotted in relative units against frequency, for example, which indicates how strongly a certain frequency is included in the signal. It is apparent that the position errors which occur with a periodicity are conspicuously prominent from the noise portion of the spectrum. The spectral power density is delivered as a controlled variable to a digital controller, which is formed in the microcomputer. The controller 16 delivers as a manipulated variable a digital signals which is converted to an analog signal by a digital-to-analog converter 20a or 20b or 20c, amplified by an amplifier 21a or 21b or 21c and then delivered to the motor 17 for driving the forward roller 2 of the delivering belt or to the motor 22 for driving the laying roller 6 or to the drive 23 for displacing the laying roller 6. Alternatively, a digital output may be generated, for example, when an AC servocontroller is used which has a digital set point input. The controller 16 selects such a manipulated variable that the spectral power density is minimized except at zero frequency.

Figure 8:
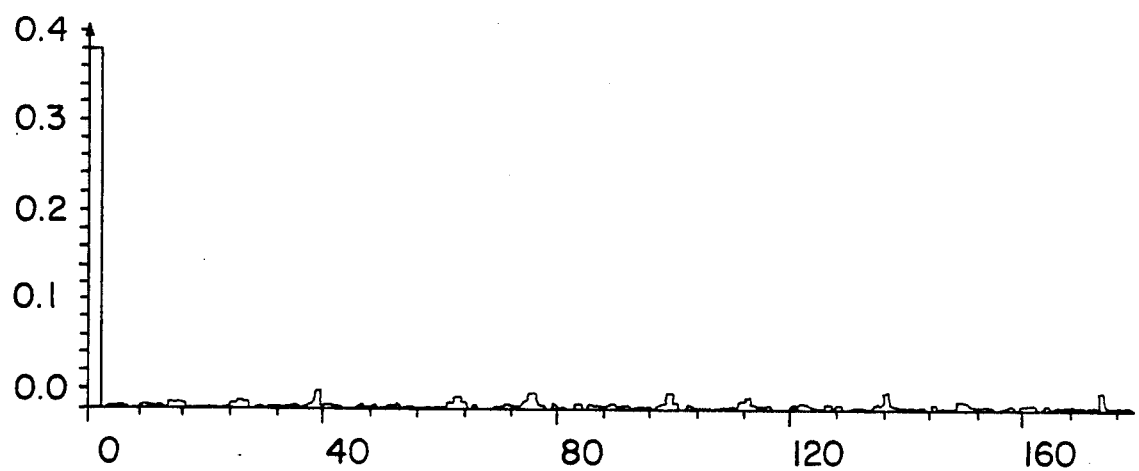
FIG. 8 shows the spectrum after the position errors have been corrected by an automatic control, which has resulted in an optimum setting of the laying machine.

FIG. 8 shows the spectrum for an optimum setting of the laying machine after a successful control. The controller 16 will preferably control the velocity v2 of the delivering belt 1 and will effect only a subsidiary control of the velocity v1 of the conveyor belt 5, particularly when it is necessary to correct the width b2 in which the non-woven fabric is laid onto the delivering belt.

Such a digital controller may be used for an almost on-line automatic control of the parameters which determine the laying operation because the time taken by the microcomputer 19 for a fast Fourier transformation is of an order of microseconds.

It has been found that a high degree of uniformity of the multilayer non-woven web 10 can be achieved with a low expenditure by the use of the process in accordance with the invention. This results in an enormous economic advantage because a production of waste in the manufacture of the non-woven fabrics and in the making of paper will be avoided. Besides, those operators which were previously needed to adjust and readjust the laying machine to the parameters by which the laying operation is determined are no longer required.

A further advantage resides in that the results of measurement may be recorded and evaluated so that a record of the course of the entire production can be obtained and together with the non-woven fabric may be delivered to the buyer as an evidence of quality.

I claim:

1. A process of detecting and compensating position errors occurring during manufacture of a multilayer non-woven fabric by a laying machine comprising a delivering belt having a controllable velocity and a direction of travel, the process comprising the steps of:
    supplying a monolayer non-woven fabric having a certain width and laying the monolayer non-woven fabric onto the delivery belt transverse to the delivery belt direction of travel by a reciprocating motion to form the multilayer non-woven fabric;
    measuring a thickness of the multilayer non-woven fabric or a mass per unit area of the multilayer non-woven fabric;
    forming a measured value signal having an amplitude representing the thickness or the mass per unit area of the multilayer non-woven fabric;
    analyzing the measured-value signal for periodic fluctuations in the signal amplitude; and
    controlling at least one parameter of a group of parameters consisting of the velocity of the delivering belt, a velocity at which the monolayer non-woven fabric is supplied, and the width in which the monolayer non-woven fabric is laid onto the delivering belt, to minimize the periodic fluctuations of the signal amplitude.

2. The process of claim 1, comprising the further step of making a frequency analysis of the measured-value signal in order to determine the periodic fluctuations.

3. The process of claim 2, comprising the further steps of:
    performing a Fourier transformation of the measured-value signal to obtain a frequency spectrum;

analyzing the frequency spectrum for frequencies in a noise portion of the spectrum; and minimizing the frequencies in the noise portion of the spectrum by automatic control.

4. The process of claim 1, comprising the further step of analyzing a low frequency portion of the measured-value signal including the periodic fluctuations.

5. The process of claim 4, comprising the further step of filtering the high frequencies from the measured-value signal before it is analyzed.

6. The process of claim 1, comprising the further step of simultaneously measuring the thickness or the mass per unit of area of the multilayer non-woven fabric at a plurality of locations which are transverse to the delivery belt direction of travel.

7. A laying machine for manufacturing a multilayer non-woven fabric having a certain thickness and mass per unit area and for detecting and compensating position errors occurring during the manufacture of the multilayer non-woven fabric, comprising:

a conveyor belt having a direction of conveyance to supply a monolayer non-woven fabric deflected at a leading end around a laying roller;

a motor for driving the conveyor belt;

a traversing drive for reciprocatively displacing the laying roller;

a delivering belt disposed below the laying roller and extended transversely to the conveyor belt, the monolayer fabric being layer onto the delivery belt by the conveyor belt to form the multilayer non-woven fabric;

a motor for driving the delivering belt;

a measuring device for continuously measuring a thickness or a mass per unit area of the multilayer non-woven fabric, and generating an output signal;

an analyzer coupled to the output signal of the measuring device, the analyzer analyzing the output signal for periodically occurring signal fluctuations; and a controller coupled to an element of the group of elements consisting of the motor for driving the conveyor belt, the traversing drive for the laying roller, and the motor for driving the delivering belt, the controller also coupled to the analyzer for receiving a controllable variable amplitude having an amplitude of the periodically occurring signals, which amplitude is to be minimized.

8. The laying machine of claim 7, further comprising a low-pass filter intercoupled between the measuring device and the analyzer.

9. The laying machine of claim 7, wherein the analyzer is a frequency analyzer.

10. The laying machine of claim 9, wherein the frequency analyzer is a computer.

11. The laying machine of claim 9, wherein the measuring device generates an analog output signal and an analog-to-digital converter is provided between the measuring device and the frequency analyzer.

12. The laying machine of claim 8, wherein the analyzer is a frequency analyzer.

13. The laying machine of claim 12, wherein the frequency analyzer is a computer.

14. The laying machine of claim 12, wherein the measuring device generates an analog output signal, and an analog-to-digital converter is provided between the measuring device and to the frequency analyzer.

* * * * *

UNITED STATES PATENT AND TRADEMARK OFFICE
CERTIFICATE OF CORRECTION

PATENT NO.  : 5,301,399
DATED       : April 12, 1994
INVENTOR(S) : ERHARDT

It is certified that error appears in the above-indentified patent and that said Letters Patent is hereby corrected as shown below:

On the title page, insert, item [30] Foreign Application Priority Data
Dec 22,1988 [DE] Germany P 38 43 180.7

Signed and Sealed this

Twenty-fifth Day of October, 1994

*Attest:*

BRUCE LEHMAN

*Attesting Officer*          Commissioner of Patents and Trademarks